United States Patent [19]

Looker

[11] Patent Number: 4,507,829

[45] Date of Patent: Apr. 2, 1985

[54] LIGHT WEIGHT TENSIONABLE BUCKLE

[76] Inventor: Robert Looker, 1509 E. El Segundo, El Segundo, Calif. 90245

[21] Appl. No.: 487,451

[22] Filed: Apr. 21, 1983

[51] Int. Cl.³ .................. A44B 11/12; A44B 21/00
[52] U.S. Cl. ......................... 24/68 CD; 24/68 CT; 24/71 T; 24/191; 24/517
[58] Field of Search ............. 24/68 CD, 68 CT, 68 R, 24/68 T, 71 T, 191, 506, 517; 292/247, 113

[56] References Cited

U.S. PATENT DOCUMENTS

| | | | |
|---|---|---|---|
| 3,099,055 | 7/1963 | Huber | 24/68 CD |
| 3,120,946 | 2/1964 | McCormack et al. | 24/68 CT |
| 3,328,856 | 7/1967 | Jonas | 24/191 |
| 3,686,715 | 8/1972 | Brodnicki | 24/68 CD |
| 3,866,272 | 2/1975 | Prete, Jr. et al. | 24/68 CD |
| 4,001,920 | 1/1977 | Johnson | 24/68 CD |
| 4,154,427 | 5/1979 | Hofmann | 24/68 CD |

Primary Examiner—Victor N. Sakran
Attorney, Agent, or Firm—Lyon & Lyon

[57] ABSTRACT

A buckle intended for use primarily with wide, flat strapping material used in the air cargo transportation industry. The buckle has a body member and an "over-center" handle member journaled on a journal pin attached thereto such that the handle member acts like a lever and the journal pin as a fulcrum in tensioning the strap. With the buckle in the open position, the strap is fed into the buckle and looped around the journal pin. Rotating the handle member to the closed position causes a load pin attached to the handle member to impact the strap and deflect its path in the buckle, thereby pulling the strap taut under considerable torque load. In the prior art buckles, two load pins were required to apportion that torque load between them to keep the strap from slipping as the load pins could rotate at high torque loads. The need for two load pins is eliminated in the present invention by using only one load pin which is attached in such a way that the pin cannot rotate, even under such high torque loads.

2 Claims, 8 Drawing Figures

LIGHT WEIGHT TENSIONABLE BUCKLE

BACKGROUND OF THE INVENTION

1. The Field of Invention

This invention relates to tensionable buckles and the like. Specifically, it pertains to an over-center tensionable buckle intended for use with wide, flat strapping material typically used with air cargo transportation.

2. The Prior Art

Devices for securing cargo during the transportation thereof are as old as drayage itself. Before the advent of air travel, the sole criteria by which such devices were evaluated was strength—was the device strong enough to hold the cargo in place during transportation. Although strength is still an important criteria (air cargo buckles designed for 1¾ inch straps must have a strength rating of 5,000 pounds), air travel and the energy crisis have added another criteria—weight. For example, currently it costs approximately $40.00 to fly one pound for one year on a Boeing 747 cargo airplane. When the countless hours such cargo planes fly is taken into consideration, the importance of weight reduction is apparent. Unfortunately, the mutual goals of strength and light weight are often evasive.

The prior art design for the typical air cargo tensionable buckle utilizes a lever and fulcrum concept to tension the strap. An "overcenter" rotatable handle portion is journaled between two side plates. The handle portion itself comprises two side panels, having, in the prior art design, three cross-pins between those side panels. The webbing material or strap is fed through and around these three pins, one of which acts as the fulcrum, the other two of which act as load pins. The handle portion is then rotated, pulling the slack out of the strapping material, and placing it under great tension.

In the prior art buckle, the load pins have a machined end of reduced diameter which extends through an appropriately sized aperture in the side panels of the handle portion of the buckle. The protruding end of the pin is staked to keep the pin in place. Unfortunately, this staking is not sufficient to keep the pins from rotating at the high torque loads typically developed in use. Of course, if the pins rotate, the webbing slips, allowing the straps to loosen, leading eventually to a shifting load which can cause serious unwanted consequences. Therefore, in the prior art buckle, three pins were used to withstand the loads encountered.

Each pin, of course, adds weight and cost to the buckle. Therefore, a buckle which could sustain similar loads without slipping with fewer pins would be a significant improvement in the art.

SUMMARY OF THE INVENTION

The buckle of this invention provides such an improvement in a buckle which is designed in such a way that only one load pin is required. The key is in the way in which the load pin is attached to the side panels of the handle portion of the buckle. The ends of the load pin of this invention have flats, (i.e., two sides of the round pin are machined flat at either end), instead of the reduced diameter section, which extend through a similar shaped hole in the side panels. This arrangement prevents the load pin from rotating even at extremely high torque loads. Additionally, the journal pin may be attached to the side plates in a similar fashion.

It is therefore the object of this invention to provide an improved tensioning buckle which obtains the same performance characteristics as its prior art predecessors, but at a reduced weight and cost.

DESCRIPTION OF THE PREFERRED EMBODIMENT

Figure 1:
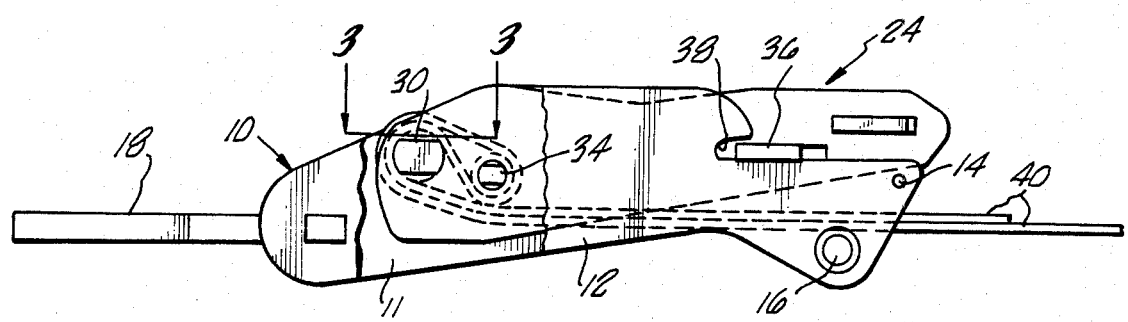
FIG. 1 is a side view of the buckle of this invention, showing the major components and the routing of the strapping. The buckle is in the closed or tensioned position.
Figure 2:
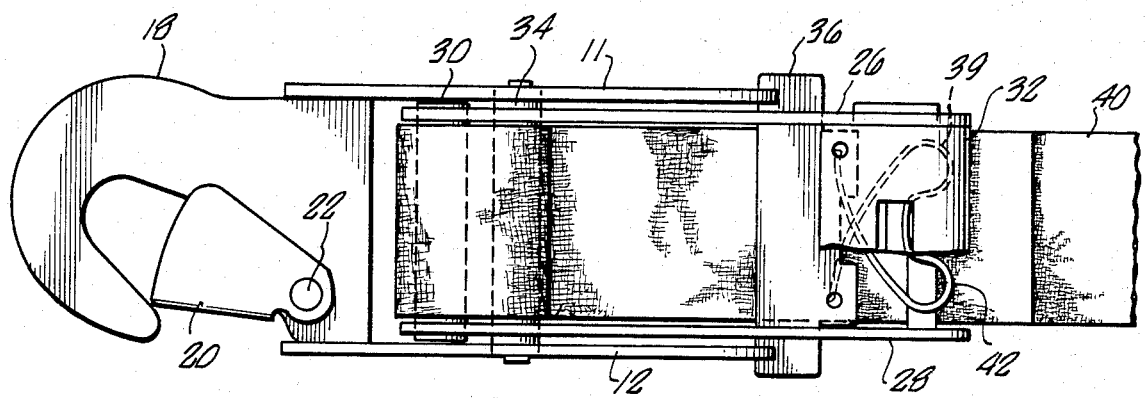
FIG. 2 is a top view of the buckle shown in FIG. 1.

The buckle of this invention is preferably constructed of aluminum.

The body 10 of the buckle is constructed of two parallel elongate side plates 11 and 12. The side plates 11 and 12 are spaced apart and retained in that position by means of crossmembers 14 and 16 which are cylindrical pins extending between and attached to the side plates 11 and 12 at one end thereof, and hook 18 which is attached to and extends between the side plates 11 and 12 at the other end thereof. A spring biased hook guard 20 is attached to the hook by means of pin 22. (The biasing spring is not shown.)

Except for the presence of the cross-members 14 and 16, and the hook 18, side plates 11 and 12 define a void space between them. Residing within this void space is the handle member, generally designated 24.

Handle member 24 has two elongate parallel side panels 26 and 28. The side panels 26 and 28 are held in their parallel alignment by means of load pin 30 and spring guard 32, both of which extend between and are attached to the side panels 26 and 28. Handle member 24 is journaled to the body 10 of the buckle by means of journal pin 34 which extends through side panel 26 and 28 and is attached to side plates 11 and 12. Journal pin 34 is located near the end of side panels 26 and 28 and provides a fulcrum for the lever action of the handle member 24. The load pin 30 is attached between side panels 26 and 28 at or near the end thereof.

Figure 7:
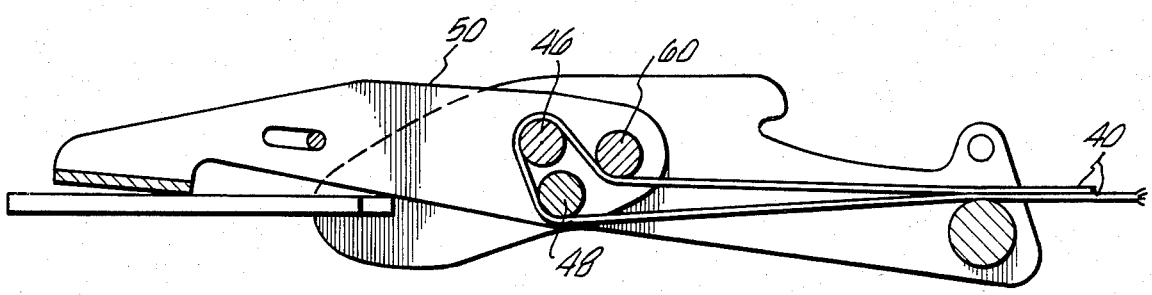
FIG. 7 is a sectional view of the prior art buckle in the open position.
Figure 8:
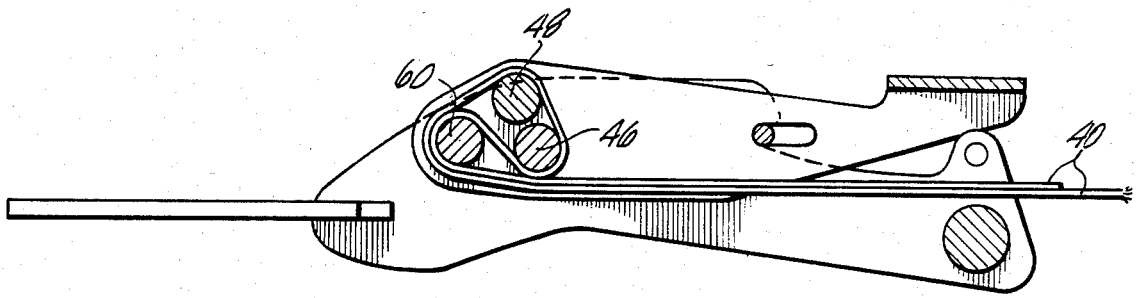
FIG. 8 is a sectional view of the prior art buckle in the closed position.

The opposite end of handle member 24 is provided with means to hold handle member 24 in a closed position relative to the body 10 of the buckle. These means comprise a spring biased stay bar 36 which catches on shoulders 38 formed in side plates 11 and 12 of the body 10 of the buckle. The stay bar 36 is biased such that it will engage the shoulders 38 by spring 39. Spring 39 is housed in the spring guard 32. The strap 40 is threaded into the buckle between cross-members 14 and 16. With handle member 24 in the fully opened position; (that is, handle member 24 is pulled up and rotated about journal pin 34 until the handle member 24 rests against hook 18, such that the relative positions of tensioning pin 30 and journal pin 34 are reversed), the strap 40 is looped around journal pin 34, and pulled back out of the buckle, under load pin 30 and between cross-members 14 and 16. It will be understood that with the strap strung in this manner, when the handle member 24 is rotated through it arc about journal pin 34, and brought to its fully closed position as shown in FIG. 1, load pin 30 is brought into contact with the strap 40 to pull slack out of the strap. Because most of the slack will have been pulled out of the strap while the handle nember 24 is still in the open position, it will be understood that the closing of handle member 24 will put tremendous stress on load pin 30 and journal pin 34. In order to accommodate this stress or load without slippage, the prior art devices utilized two load pins 46 and 48 along with journal pin 60. (See FIGS. 7 and 8). As recently discovered, the slippage occurred as a result of the way in which the load pins were attached to the side panels.

Figure 6:
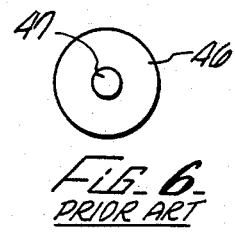
FIG. 6 is an end view of the prior art buckle load pin.
Figure 5:
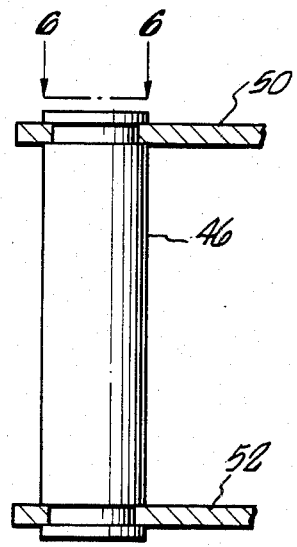
FIG. 5 is a top view of the prior art buckle load pin as it is staked to the side plates of the handle.

As shown in FIGS. 5 and 6, the prior art buckle attached load pins 46 and 48 to the side panels 50 and 52 by reducing the diameter of pin 46 and 48 and inserting that reduced cylindrical portion 47 through an appropriately sized aperture in the side panels 50 and 52. This arrangement would allow for rotation of the load pin when it was under sufficient load.

Figure 3:
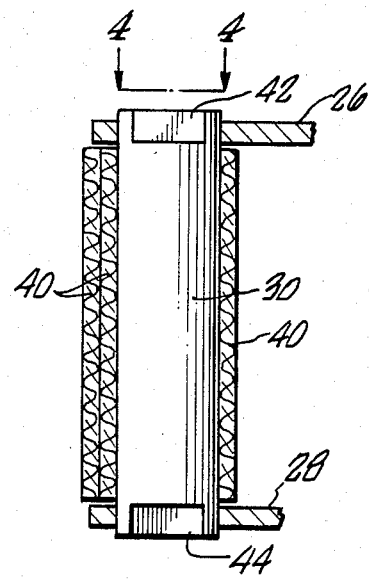
FIG. 3 is a top view in cross-section, taken along line 3—3 of FIG. 1, showing the load pin of this invention.
Figure 4:
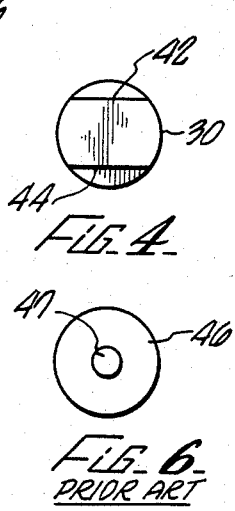
FIG. 4 is an end view of the load pin of this invention showing the flats on the ends thereof.

In the present invention, however, the rotation of load pin 30 and journal pin 34 is precluded. This may be done in a variety of ways. In the preferred embodiment, as shown in FIG. 3, the ends of load pin 30 are fitted with two flats 42 and 44. The ends of load pin 30, so shaped, are inserted into similarly shaped apertures in side panels 26 and 28. The ends of journal pin 34 are similarly shaped and attached to side plates 11 and 12. This construction not only precludes rotation, but is also cheaper and faster to manufacture than that used in the prior art. Since the single load pin and the journal pin cannot rotate, the buckle will sustain and hold the load on the strap which used to require two load pins plus the journal pin.

Although specific embodiments of this invention have been shown and described, it would be apparent to those skilled in the art that many modifications of the specific ebodiments could be made without departing from the inventive concept claimed herein. Accordingly, the invention is not to be limited to the above-described specific embodiments, but is of the full breath and scope of the appended claims.

What is claimed is:

1. An over-center tensionable buckle for use with wide, flat straps and the like, comprising:
   a. a body member having two parallel elongate side plates defining a void space therebetween;
   b. a handle member having two parallel elongate side panels which define a void space therebetween to accommodate the strap, said handle member rotatable relative to said body member from an open position to a closed position about a journal pin which extends across said void space and is rotatably attached to and extends through said side panels and is there fixedly and non-rotatably attached to said side plates, around which journal pin the strap is to be looped; and
   c. a load pin fixedly and non-rotatably attached to and extending between said side panels of said handle member such that said load pin contacts and pulls the slack out of the strap upon rotation of said handle member from its open position to its closed position.

2. The buckle of claim 1 wherein said load pin and said journal pin are substantially cylindrical in shape, having opposing flat shoulders formed in either end thereof for insertion in similarly shaped apertures in said side panels and said side plates, respectively, such that said load pin and said journal pin cannot rotate relative to said side panels and said side plates, respectively.

* * * * *